Patented Nov. 13, 1923.

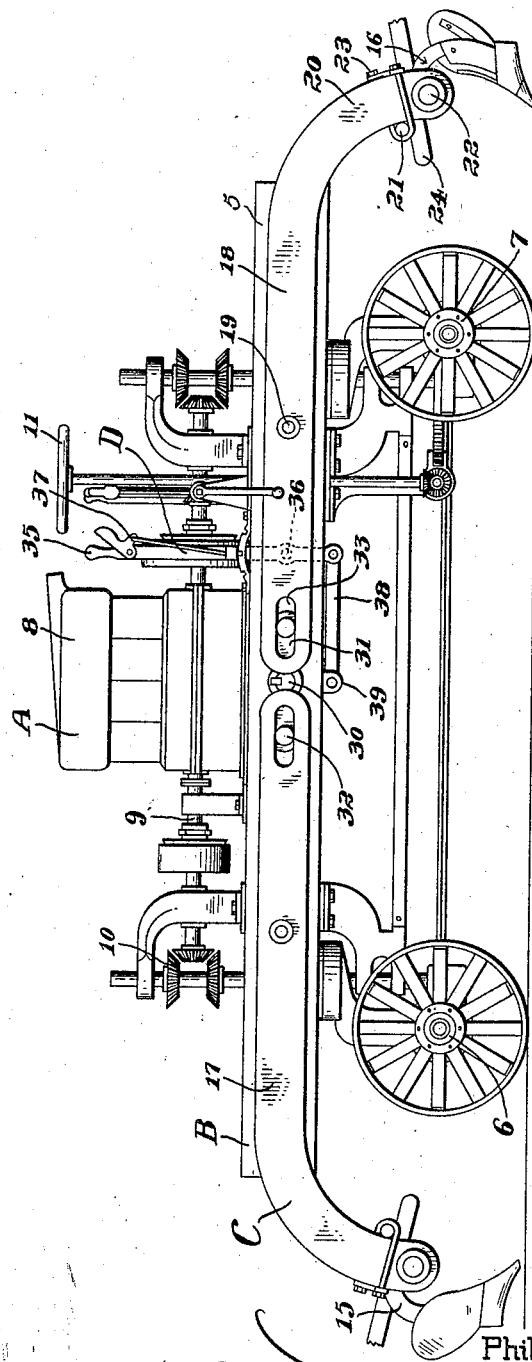

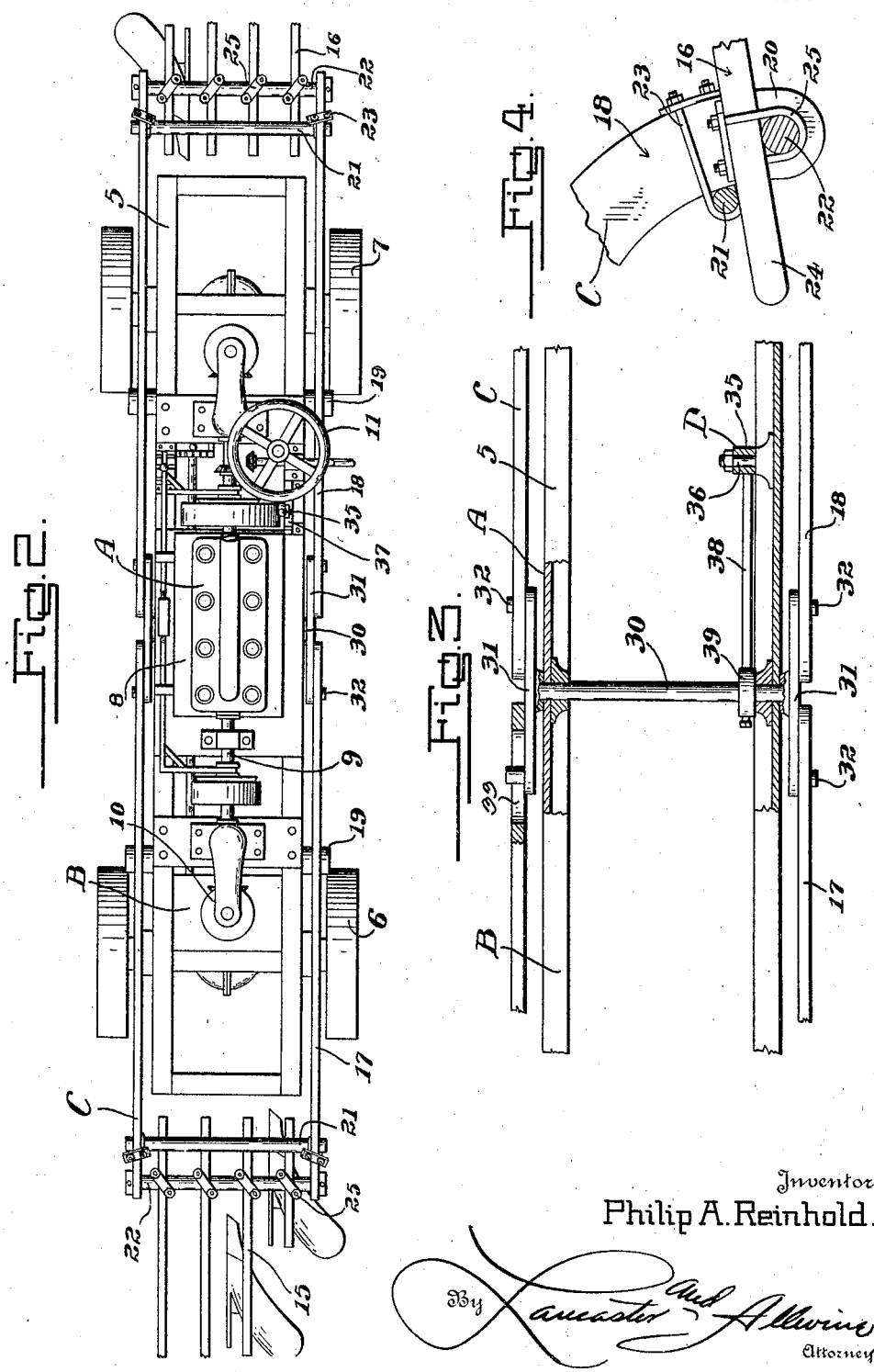

1,474,291

UNITED STATES PATENT OFFICE.

PHILIP A. REINHOLD, OF AKRON, OHIO.

PLOW.

Original application filed May 21, 1920, Serial No. 383,223. Divided and this application filed January 9, 1922. Serial No. 528,103.

*To all whom it may concern:*

Be it known that I, PHILIP A. REINHOLD, a citizen of the United States, residing at Akron, in the county of Summit and State of Ohio, have invented certain new and useful Improvements in Plows, of which the following is a specification.

This invention relates to plows and the primary object of the invention is to provide a novel tractor plow embodying a wheeled frame capable of being driven in either direction and oppositely disposed gangs of plows having means for permitting the same to be readily raised or lowered.

Another object of the invention is to provide an improved means for operating the oppositely disposed gangs of plows from a central point, said means being so constructed as to move one set of plows in the ground and to move the other set away from the ground into an inoperative position.

A further object of the invention is the provision of pairs of guide or draw beams for the gangs of plows pivotally secured intermediate their ends to the frame of the tractor, the outer terminals of the guide or draw beams having the gangs of plows associated therewith, the inner ends of the beams having a single operating means connected therewith for permitting the operation of the guide or draw beams for moving the gangs of plows into and out of an operative position and for holding the plows in their adjusted positions.

A still further object of the invention is to provide a novel means for connecting the plows to the guide or draw beams, so that the plow shares can be free to swing, when a rigid article is struck, such as a stone or the like, whereby injury to the plow shares will be obviated.

With these and other objects in view the invention consists in the novel construction, arrangement and formation of parts, as will be hereinafter more specifically described, claimed and illustrated in the accompanying drawings, forming a part of this specification, in which:

Figure 1 is a side elevation of the improved tractor plow.

Fig. 2 is a top plan view of the improved tractor plow.

Fig. 3 is an enlarged fragmentary horizontal section through the frame illustrating the means carried thereby for permitting the ready raising and lowering of the gangs of plows, and Fig. 4 is an enlarged detail fragmentary vertical section through one of the plow gangs illustrating the means of connecting the plow shares with the supporting or carrying beam.

Referring to the drawings in detail, wherein similar reference characters designate corresponding parts throughout the several views the letter A generally indicates the improved tractor plow, which includes the tractor proper B, and the gangs of plows C, and the operating and holding means D therefor.

The tractor proper B is of the four wheel drive reversible type, that is one that can be readily driven in either direction and is preferably, but not necessarily, constructed the same as the tractor disclosed in my pending application filed May 21, 1920, Serial Number 383,223, which has resulted in Patent No. 1,423,736, issued July 25, 1922, of which the present application is a division. Inasmuch as the tractor B illustrated in the drawings is the same as the tractor disclosed in the parent application the same will be here only briefly described.

The tractor B as shown includes an elongated rectangular frame 5, supported upon pairs of drive ground wheels 6 and 7 which are driven from a power plant 8, which is preferably disposed substantially at the transverse center of the frame in order to equally distribute the weight thereof over the entire area of the frame. The pairs of drive wheels 6 and 7 can be connected with the crank shaft 9 of the engine by a preferred type of reversing mechanism 10, so that the wheels can be driven in a clockwise or counter-clockwise direction, whereby the tractor can be driven in either direction.

The pairs of wheels 6 and 7 are dirigible and are steered by any preferred type of steering mechanism 11. The plow construction includes right and left oppositely disposed gangs of plows 15 and 16. These gangs of plows are carried by pairs of guide or draw beams 17 and 18, which are secured intermediate their ends upon suitable pivot pins or the like 19 carried by side beams of the tractor frame. These pairs of beams 17 and 18 extend inwardly and terminate substantially at the central portion of the frame of the tractor. The outer ends of the beams are bent downwardly as at 20 and extend beyond the terminals of the frame and are connected by pairs of transversely extending supporting bars 21 and 22. The bar 21 may be detachably connected to the lower angled terminal of the side beams 17 and 18 and as shown several U-shaped clevises or clips 23 are provided for this purpose. The plow beams 24 for the gangs of plows 15 and 16 are placed intermediate the beams 21 and 22 so as to engage the opposite faces thereof and the plow beams 24 are preferably secured to the lower beam 22 by means of U-shaped clips 25. These clips permit the plow beams to swing thereon. Thus when a stone or other solid object is struck by one of the plows the same is moved upwardly under the influence thereof and which prevents the breaking of the plow point. The gangs of plows 15 and 16 are provided so that the necessity of turning the tractor around at the end of the furrow is prevented and it is merely necessary to raise one plow gang and lower the other plow when the end of the furrow is reached. This is permitted owing to the fact that all four wheels of the tractor are dirigible and that the same can be turned at an angle to the frame so as to allow the frame to move transversely.

The means D for simultaneously operating the gangs of plows 15 and 16 comprises a transversely extending operating shaft 30 the terminals of which are suitably journaled in the side beams of the frame of the tractor. It is preferred that the ends of the shaft 30 extend slightly beyond the sides of the frame of the tractor so that the same may support the double armed crank levers 31, which can be keyed to the operating shaft 30 if so desired. The terminals of the double crank levers 31 are provided with crank pins 32 which are slidably mounted in slots 33 formed in the inner ends of the pairs of draw beams 17 and 18.

An operating hand lever 35 is pivotally secured intermediate its ends as at 36 to the frame of the tractor adjacent to the transverse center thereof and this hand lever is adapted to be held in any desired adjustable position by suitable pawl and rack mechanism 36 which can be of the ordinary construction. The lower end of the hand lever 35 has pivotally connected thereto a link 38 which is in turn pivotally connected to a depending crank arm 39, which is rigidly secured in any preferred manner to the transversely extending operating shaft 30.

By this construction, it can be seen that when the lever 35 is shifted in one direction it will operate the double crank arms 31, thus raise the outer ends of one pair of beams 17 or 18 and lower the outer ends of the other pair of beams 17 or 18. This will effectively carry one gang of plow beams into operative position and the other gang of beams into an inoperative position. It also can be seen that the gangs of plows can be held in an intermediate position by simply placing the hand lever at an intermediate point.

From the foregoing description, it can be seen that an efficient tractor plow has been provided which is provided with oppositely disposed gangs of plows, that can be readily and easily swung to an operative or an inoperative position.

Changes in details may be made without departing from the spirit or scope of this invention, but what I claim as new, is—

1. In a plow, a wheeled supporting frame, pairs of draw beams disposed on opposite sides of the frame and terminating adjacent to the transverse center thereof, means pivotally securing the pairs of beams intermediate their ends to the frame, gangs of oppositely disposed plows secured to the outer ends of the pairs of beams, a transversely extending operating shaft carried by the frame, double crank arms secured to the terminals of the shaft, crank pins carried by the terminals of the double crank arms, the inner ends of the beams having slots formed therein arranged to receive said pins, a single operating lever, means for locking the lever against movement, and means operatively connecting the lever with said shaft.

2. The combination of a tractor including a longitudinally extending frame, a centrally disposed power plant, drive axles, means for operatively connecting the drive axles with the power plant, of pairs of side beams pivotally secured intermediate their ends to said frame, said side beams ending at the transverse center of the frame, the outer ends of said side beams being angled and extending beyond the ends of the frame, a transversely extending bar secured to the terminals of the side beams, a second transversely extending bar detachably secured to the side beams and arranged above the first mentioned transversely extending bar, plows carried by said bars, and means including a single lever for simultaneously raising one pair of said side beams and for lowering the other pair of side beams.

3. The combination with a tractor including a longitudinally extending frame, a centrally disposed power plant, pairs of drive wheels, means operatively connecting the power plant with the drive wheels, of pairs of spaced side beams pivotally secured intermediate their ends to said frame and embracing said frames, said beams terminating at the transverse center of the frame, the outer ends of said beams being angled downward and extended beyond the ends of the frame, supporting bars secured to the outer terminals of the beams, a transversely extending shaft arranged at the transverse center of the frame intermediate the inner terminals of the side beams, outwardly extending arms carried by the terminals of the shaft, outwardly extending pivot pins carried by the outer terminals of the arms, the inner terminals of said beams having slots therein arranged to receive said pins, a pivoted operating lever, means for locking said lever in any adjusted position, a crank arm secured to the shaft, and a link pivotally connecting the crank arm with said operating lever.

4. In a plow, a pair of transversely extending spaced beams, a plow share, a plow beam extended intermediate the spaced beams arranged to engage the opposite faces thereof, and means for connecting the plow beam to the lowermost beam for swinging movement.

PHILIP A. REINHOLD.